US012802981B2

(12) United States Patent
Hamamura et al.

(10) Patent No.: US 12,802,981 B2
(45) Date of Patent: Nov. 17, 2026

(54) POSITIVE ELECTRODE MATERIAL AND BATTERY

(71) Applicant: Panasonic Intellectual Property Management Co., Ltd., Osaka (JP)

(72) Inventors: Tomofumi Hamamura, Kanagawa (JP); Yoshimasa Nakama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 489 days.

(21) Appl. No.: 18/525,944

(22) Filed: Dec. 1, 2023

(65) Prior Publication Data

US 2024/0105936 A1 Mar. 28, 2024

Related U.S. Application Data

(63) Continuation of application No. PCT/JP2022/020874, filed on May 19, 2022.

(30) Foreign Application Priority Data

Jun. 17, 2021 (JP) ................................ 2021-101141

(51) Int. Cl.
*H01M 4/505* (2010.01)
*H01M 4/525* (2010.01)
(Continued)

(52) U.S. Cl.
CPC ........... *H01M 4/525* (2013.01); *H01M 4/505* (2013.01); *H01M 10/052* (2013.01);
(Continued)

(58) Field of Classification Search
CPC .... H01M 4/525; H01M 4/505; H01M 10/052; H01M 10/0562; H01M 2004/028;
(Continued)

(56) References Cited

U.S. PATENT DOCUMENTS

2013/0101900 A1* 4/2013 Nagai .................. H01M 4/485 429/223
2015/0221929 A1* 8/2015 Lu ....................... H01M 4/1391 428/221

(Continued)

FOREIGN PATENT DOCUMENTS

EP 4174022 A1 5/2023
JP 2006-244734 9/2006

(Continued)

OTHER PUBLICATIONS

International Search Report of PCT application No. PCT/JP2022/020874 dated Aug. 16, 2022.

(Continued)

*Primary Examiner* — Christopher T Schatz
*Assistant Examiner* — Arti Khanal
(74) *Attorney, Agent, or Firm* — Rimon P.C.

(57) ABSTRACT

A positive electrode material comprises a positive electrode active material containing lithium nickel cobalt manganese oxide having an α-$NaFeO_2$ structure and a solid electrolyte material. The solid electrolyte material contains Li, Ti, M1, and F, and M1 is at least one selected from the group consisting of Ca, Mg, Al, Y, and Zr.

10 Claims, 2 Drawing Sheets

(51) Int. Cl.
*H01M 10/052* (2010.01)
*H01M 10/0562* (2010.01)
*H01M 4/02* (2006.01)

(52) U.S. Cl.
CPC .. *H01M 10/0562* (2013.01); *H01M 2004/028* (2013.01); *H01M 2300/008* (2013.01)

(58) Field of Classification Search
CPC ....... H01M 2300/008; H01M 10/0525; H01M 4/131; H01M 4/62; H01M 4/36; Y02E 60/10
See application file for complete search history.

(56) References Cited

U.S. PATENT DOCUMENTS

| | | | | |
|---|---|---|---|---|
| 2019/0097219 | A1 | 3/2019 | Goto | |
| 2020/0075993 | A1 * | 3/2020 | Ling | H01M 4/0404 |
| 2022/0416296 | A1 | 12/2022 | Nakama et al. | |
| 2023/0106765 | A1 | 4/2023 | Takeuchi et al. | |

FOREIGN PATENT DOCUMENTS

| | | |
|---|---|---|
| JP | 2019-057450 | 4/2019 |
| JP | 2021-034326 | 3/2021 |
| WO | 2021/187391 | 9/2021 |
| WO | 2022/004397 | 1/2022 |

OTHER PUBLICATIONS

The EPC Office Action dated Jul. 29, 2025 for the related European Patent Application No. 22824742.5.

* cited by examiner

POSITIVE ELECTRODE MATERIAL AND BATTERY

BACKGROUND

1. Technical Field

The present disclosure relates to a positive electrode material and a battery.

2. Description of the Related Art

Japanese Unexamined Patent Application Publication No. 2021-34326 (PTL 1) discloses an all-solid-state battery including a lithium-nickel-cobalt-manganese composite oxide as the positive electrode active material. PTL 1 also discloses a sulfide solid electrolyte having an argyrodite-type crystal structure as the solid electrolyte suitable for the positive electrode.

Japanese Unexamined Patent Application Publication No. 2006-244734 (PTL 2) discloses a battery including, as the solid electrolyte, a compound containing indium as a cation and a halogen element as an anion. PTL 2 discloses that, as the halogen element in the solid electrolyte, chlorine, bromine, or iodine is used, and chlorine or bromine is preferably used.

SUMMARY

A solid electrolyte for a positive electrode requires oxidation resistance. A sulfide solid electrolyte typically has low oxidation resistance.

According to PTLs 1 and 2, a combination of lithium nickel cobalt manganese oxide (or NCM) and an electrolyte containing halogen may be used for a positive electrode of a battery. However, such a combination still has a problem of electrolyte decomposition. Thus, there is a demand for a positive electrode material containing lithium nickel cobalt manganese oxide and an electrolyte that is resistant to oxidative degradation.

One non-limiting and exemplary embodiment provides a positive electrode material containing lithium nickel cobalt manganese oxide and an electrolyte that is resistant to oxidative degradation.

In one general aspect, the techniques disclosed here feature a positive electrode material comprising: a positive electrode active material containing lithium nickel cobalt manganese oxide having an $\alpha$-$NaFeO_2$ structure; and a solid electrolyte material, wherein the solid electrolyte material contains Li, Ti, M1, and F, and M1 is at least one selected from the group consisting of Ca, Mg, Al, Y, and Zr.

The present disclosure can provide a positive electrode material containing lithium nickel cobalt manganese oxide and an electrolyte that is resistant to oxidative degradation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
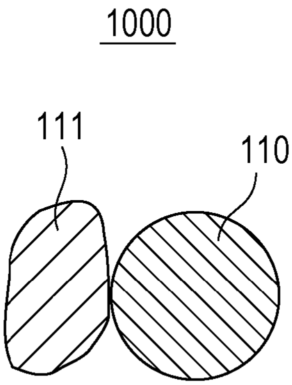
FIG. 1 is a view illustrating a positive electrode material according to a first embodiment.

Underlying Knowledge Forming Basis of the Present Disclosure

A halide solid electrolyte is a material that contains a halogen element, such as fluorine (or F), chlorine (or Cl), bromine (or Br), and iodine (or I), as an anion. The resistance of the halide solid electrolyte to oxidative degradation differs depending on the kind of element contained as an anion.

Specifically, a battery that includes a halide solid electrolyte containing at least one selected from the group consisting of chlorine, bromine, and iodine in the positive electrode material may include a positive electrode active material having an average potential versus Li of less than or equal to 3.9 V. However, in such a case, the halide solid electrolyte may be oxidatively degraded during charge. This problem may be caused by the oxidation reaction of the element of the halide solid electrolyte, which is one of the elements selected from the group consisting of chlorine, bromine, and iodine. Herein, the oxidation reaction refers to not only a common charge reaction in which lithium and electrons are taken from the positive electrode active material included in the positive electrode material, but also a side reaction in which electrons are taken from the halide solid electrolyte containing at least one element selected from the group consisting of chlorine, bromine, and iodine in contact with the positive electrode active material. The oxidation reaction forms an oxidative degradation layer having poor lithium-ion conductivity between the positive electrode active material and the halide solid electrolyte, and the oxidative degradation layer seems to act as a large interfacial resistance in the electrode reaction of the positive electrode. Chlorine, bromine, and iodine are thought to be readily oxidized because of their relatively large ionic radius and a small interaction force with a cationic component that constitutes the halide solid electrolyte.

The inventors have revealed that, when a positive electrode material contains lithium nickel cobalt manganese oxide and a solid electrolyte material and the solid electrolyte material is a fluorine-containing halide solid electrolyte, the positive electrode material shows high oxidation resistance, and thus a battery including the positive electrode material is less likely to increase in internal resistance while charging. Although the specific mechanism of this is not clear, this may be resulted from the halide solid electrolyte containing fluorine, which has a high electronegativity among halogen elements, as the anions. This allows the halide solid electrolyte to strongly bond with the cations, and thus the fluorine oxidation reaction, i.e., a side reaction in which electrons are taken from fluorine, may be less likely to occur.

When the fluorine-containing halide solid electrolyte contains lithium (or Li), titanium (or Ti), and M1, in which M1 is at least one element selected from the group consisting of calcium (or Ca), magnesium (or Mg), aluminum (or Al), yttrium (or Y), and zirconium (or Zr), the fluorine-containing halide solid electrolyte has high lithium-ion conductivity and high oxidation resistance.

With the above findings, the inventors have arrived at the following battery of the present disclosure.

Summary of Aspects of the Present Disclosure

A positive electrode material according to a first aspect of the present disclosure comprises:

a positive electrode active material containing lithium nickel cobalt manganese oxide having an $\alpha$-$NaFeO_2$ structure; and a solid electrolyte material, wherein the solid electrolyte material contains Li, Ti, M1, and F, and M1 is at least one selected from the group consisting of Ca, Mg, Al, Y, and Zr.

The first aspect can provide a positive electrode material containing lithium nickel cobalt manganese oxide and an electrolyte that is resistant to oxidative degradation.

According to a second aspect of the present disclosure, for example, in the positive electrode material according to the first aspect, in the lithium nickel cobalt manganese oxide, a ratio m2/m1 may be less than or equal to 0.85 where m1 represents a total amount of substances of Ni, Co, and Mn and m2 represents an amount of substance of Ni. This configuration can provide a battery having a high average discharge voltage.

According to a third aspect of the present disclosure, for example, in the positive electrode material according to the second aspect, the ratio m2/m1 may be less than or equal to 0.83. This configuration can provide a battery having a high average discharge voltage.

According to a fourth aspect of the present disclosure, for example, in the positive electrode material according to any one of the first to third aspects, in the lithium nickel cobalt manganese oxide, a ratio m3/m1 may satisfy $0.18<m3/m1<0.37$ where m1 represents a total amount of substances of Ni, Co, and Mn and m3 represents an amount of substance of Mn. This configuration can provide a battery having a high average discharge voltage.

According to a fifth aspect of the present disclosure, for example, in the positive electrode material according to the fourth aspect, the ratio m3/m1 may satisfy $0.20<m3/m1<0.34$. This configuration can provide a battery having a high average discharge voltage.

According to a sixth aspect of the present disclosure, for example, in the positive electrode material according to any one of the first to fifth aspects, the lithium nickel cobalt manganese oxide may be represented by $LiMeO_2$, and Me may contain Ni, Co, and Mn. In this case, lithium nickel cobalt manganese oxide can be chemically stable and can have excellent cycle characteristics.

According to a seventh aspect of the present disclosure, for example, in the positive electrode material according to any one of the first to sixth aspects, M1 may contain at least one selected from the group consisting of Al and Y.

According to an eighth aspect of the present disclosure, for example, in the positive electrode material according to any one of the first to seventh aspects, M1 may be Al.

According to a ninth aspect of the present disclosure, for example, in the positive electrode material according to any one of the first to eighth aspects, the solid electrolyte material may have a crystalline phase represented by the following Formula (2):

$$Li_{b-(4-x2)b2}(Ti_{1-x2}M1_{x2})_{b2}F_6 \quad (2)$$

where $0<x2<1$ and $0<b2\leq1.5$ are satisfied.

According to a tenth aspect of the present disclosure, for example, in the positive electrode material according to any one of the first to ninth aspects, the solid electrolyte material may contain $Li_{2.6}Ti_{0.4}Al_{0.6}F_6$.

In the seventh to tenth aspects, the solid electrolyte material can have higher ionic conductivity.

A battery according to an eleventh aspect of the present disclosure comprises:

a positive electrode;

a negative electrode; and an electrolyte layer disposed between the positive electrode and the negative electrode, wherein the positive electrode contains the positive electrode material according to any one of the first to tenth aspects.

The eleventh aspect can provide a battery that can be charged and discharged.

Hereafter, embodiments of the present disclosure will be described with reference to the drawings.

First Embodiment

FIG. 1 is a cross-sectional view illustrating a schematic configuration of a positive electrode material 1000 according to a first embodiment. As illustrated in FIG. 1, the positive electrode material 1000 according to the first embodiment contains a positive electrode active material 110 and a solid electrolyte material 111. Here, the positive electrode active material 110 may contain lithium nickel cobalt manganese oxide. The lithium nickel cobalt manganese oxide has an $\alpha$-$NaFeO_2$ structure. The $\alpha$-$NaFeO_2$ structure is also called a layered rock-salt type structure. The solid electrolyte material 111 contains Li, Ti, M1, and F. M1 is at least one selected from the group consisting of Ca, Mg, Al, Y, and Zr. Hereinafter, the solid electrolyte material 111 is also referred to as a "first solid electrolyte material" in this specification.

The positive electrode material 1000 having the above configuration has high oxidation resistance. Furthermore, the solid electrolyte material 111 has high ionic conductivity. This enables the positive electrode material 1000 to have low interfacial resistance between the solid electrolyte material 111 and the positive electrode active material 110.

The solid electrolyte material 111 has high oxidation resistance because it contains F. This is attributed to F having a high redox potential. Meanwhile, F has high electronegativity, and thus F and Li are relatively strongly bonded to each other. Thus, the solid electrolyte material containing Li and F generally tends to have low lithium-ion conductivity. For example, $LiBF_4$ has a low ionic conductivity of $6.67\times10^{-9}$ S/cm. In contrast, the solid electrolyte material 111 in this embodiment contains Ti and M1 in addition to Li and F. Thus, the ionic conductivity can be, for example, greater than or equal to $1\times10^{-8}$ S/cm.

Solid Electrolyte Material 111

The solid electrolyte material 111 contains Li, Ti, M1, and F.

M1 may be at least one selected from the group consisting of Ca and Mg.

The above configuration allows the solid electrolyte material 111 to have higher ionic conductivity. Thus, the positive electrode material 1000 can have low interfacial resistance between the solid electrolyte material 111 and the positive electrode active material 110.

When M1 is at least one selected from the group consisting of Ca and Mg, a ratio of an amount of substance of Li to the total amount of substances of Ca, Mg, and Ti may be greater than or equal to 0.5 and less than or equal to 4.5.

When M1 is at least one selected from the group consisting of Ca and Mg, the solid electrolyte material 111 may contain a crystalline phase represented by the following Formula (1).

$$Li_{6(4-2x1)b1}(Ti_{1-x1}M1_{x1})_{b1}F_6 \quad (1)$$

where $0<x1<1$ and $0<b1\leq3$ are satisfied.

In Formula (1), $0.05\leq x1\leq0.9$ may be satisfied.

In Formula (1), M1 may be Mg, and $0.05\leq x1\leq0.6$ may be satisfied.

In Formula (1), M1 may be Ca, and $x1=0.5$ may be satisfied.

In Formula (1), $0.80\leq b1\leq1.71$ may be satisfied.

The above configuration allows the solid electrolyte material 111 to have higher ionic conductivity.

The solid electrolyte material 111 may contain $Li_3Ti_{0.5}Mg_{0.5}F_6$.

The above configuration allows the solid electrolyte material 111 to have higher ionic conductivity. Thus, the positive electrode material 1000 can have low interfacial resistance between the solid electrolyte material 111 and the positive electrode active material 110.

The solid electrolyte material 111 may contain $Li_3Ti_{0.5}Ca_{0.5}F_6$.

The above configuration allows the solid electrolyte material 111 to have higher ionic conductivity. Thus, the positive electrode material 1000 can have low interfacial resistance between the solid electrolyte material 111 and the positive electrode active material 110.

M1 may contain at least one selected from the group consisting of Al and Y. M1 may be at least one selected from the group consisting of Al and Y. M1 may be Al.

The above configuration allows the solid electrolyte material 111 to have higher ionic conductivity. Thus, the positive electrode material 1000 can have low interfacial resistance between the solid electrolyte material 111 and the positive electrode active material 110.

When M1 is at least one selected from the group consisting of Al and Y, the ratio of an amount of substance of Li to the total amount of substances of Al, Y, and Ti may be greater than or equal to 1.7 and less than or equal to 4.2.

When M1 is at least one selected from the group consisting of Al and Y, the solid electrolyte material 111 may have a crystalline phase represented by the following Formula (2).

$$Li_{6-(4-x2)b2}(Ti_{1-x2}M1_{x2})_{b2}F_6 \quad (2)$$

where $0<x2<1$ and $0<b2\leq1.5$ are satisfied.

In Formula (2), M1 may be Al.

In Formula (2), $0.1\leq x2\leq0.9$ may be satisfied.

In Formula (2), M1 may be Y, and $0.3\leq x2\leq0.7$ may be satisfied.

In Formula (2), $0.8\leq b2\leq1.2$ may be satisfied.

The above configuration allows the solid electrolyte material 111 to have higher ionic conductivity.

The solid electrolyte material 111 may contain $Li_{2.6}Ti_{0.4}Al_{0.6}F_6$.

The above configuration allows the solid electrolyte material 111 to have higher ionic conductivity. Thus, the positive electrode material 1000 can have low interfacial resistance between the solid electrolyte material 111 and the positive electrode active material 110.

M1 may contain Zr.

The above configuration allows the solid electrolyte material 111 to have higher ionic conductivity. Thus, the positive electrode material 1000 can have low interfacial resistance between the solid electrolyte material 111 and the positive electrode active material 110.

When M1 is Zr, the ratio of the amount of substance of Li to the total amount of substances of Ti and Zr may be greater than or equal to 2.0 and less than or equal to 6.0.

When M1 is Zr, the solid electrolyte material 111 may have a crystalline phase represented by the following Formula (3).

$$Li_{6-4b3}(Ti_{1-x3}Zr_{x3})_{b3}F_6 \quad (3)$$

where $0<x3<1$ and $0<b3\leq1.5$ are satisfied.

In Formula (3), $0.1\leq x3\leq0.8$ may be satisfied.

In Formula (3), $0.6\leq b3\leq1.0$ may be satisfied.

The above configuration allows the solid electrolyte material 111 to have higher ionic conductivity.

The solid electrolyte material 111 may contain $Li_3Ti_{0.5}Zr_{0.5}F_7$.

The above configuration allows the solid electrolyte material 111 to have higher ionic conductivity. Thus, the positive electrode material 1000 can have low interfacial resistance between the solid electrolyte material 111 and the positive electrode active material 110.

M1 may contain Al and at least one selected from the group consisting of Mg and Zr.

The above configuration allows the solid electrolyte material 111 to have higher ionic conductivity. Thus, the positive electrode material 1000 can have low interfacial resistance between the solid electrolyte material 111 and the positive electrode active material 110.

When M1 contains Al and at least one selected from the group consisting of Mg and Zr, the ratio of the amount of substance of Li to the total amount of substances of Zr, Mg, Ti, and Al may be greater than or equal to 1.33 and less than or equal to 3.79.

When M1 contains Al and at least one selected from the group consisting of Mg and Zr, the solid electrolyte material 111 may have a crystalline phase represented by the following Formula (4).

$$Li_{6-(4-x4-(4-m)y)b4}(Ti_{1-x4-y}Al_{x4}M1_y)_{b4}F_6 \quad (4)$$

where m represents the valence of M1, and $0<x4<1$, $0<y<1$, $0<(x4+y)<1$, and $0<b4\leq1.5$ are satisfied.

In Formula (4), $0.05\leq x4\leq0.9$ may be satisfied.

In Formula (4), $0.05\leq y\leq0.9$ may be satisfied.

In Formula (4), M1 may be Mg, and $0.33\leq x4\leq0.7$ may be satisfied.

In Formula (4), M1 may be Mg, and $0.1\leq y\leq0.33$ may be satisfied.

In Formula (4), $0.8\leq b4\leq1.2$ may be satisfied.

The above configuration allows the solid electrolyte material 111 to have higher ionic conductivity.

To further increase the ionic conductivity of the solid electrolyte material 111, the solid electrolyte material 111 may contain an element other than F as an anion. Examples of the element contained as the anion include Cl, Br, I, O, S, and Se.

The solid electrolyte material 111 does not have to contain sulfur. The solid electrolyte material that does not contain sulfur is safe because it does not generate hydrogen sulfide when exposed to the atmosphere.

The solid electrolyte material 111 may consist essentially of Li, Ti, M1, and F. The solid electrolyte material 111 may consist solely of Li, Ti, Al, and F.

The phrase "consist essentially of" excludes other components that alter basic characteristics of the subject material. The phrase "consist solely of" excludes intentional addition of other materials except for inevitable impurities.

The solid electrolyte material 111 may contain elements that are inevitably mixed in. Examples of the elements include hydrogen, oxygen, and nitrogen. Such elements may be contained in the raw material powder of the solid electrolyte material 111 or may be present in the atmosphere for manufacturing and storing the solid electrolyte material 111.

The shape of the solid electrolyte material 111 is not limited. The solid electrolyte material 111 may have a particulate shape. Examples of the particulate shape include an acicular shape, a spherical shape, and an ellipsoidal shape. The solid electrolyte material 111 may be in a pellet or plate form.

The median diameter of the solid electrolyte material 111 may be greater than or equal to 0.1 μm and less than or equal to 100 μm. With this configuration, the positive electrode active material 110 and the solid electrolyte material 111 can be favorably dispersed in the positive electrode material 1000. This improves the charge and discharge properties of a battery including the positive electrode material 1000. The median diameter of the solid electrolyte material 111 may be less than or equal to 10 μm. The solid electrolyte material 111 may have a smaller median diameter than the positive electrode active material 110.

The solid electrolyte material 111 is produced, for example, by the following method.

Raw material powders are provided and mixed to give a desired composition. The raw material powder is, for example, a halide.

For example, if the desired composition is $Li_{2.6}Ti_{0.3}Al_{0.7}F_6$, LiF, $TiF_4$, and $AlF_3$ are mixed in a molar ratio of about 2.6:0.3:0.7. Raw material powders may be mixed at a molar ratio adjusted in advance so as to offset the change in composition that may occur in the synthesis process.

The raw material powders are mechanochemically reacted with each other in a mixer, such as a planetary ball mill, i.e., the raw material powders are mixed by a method of mechanochemical milling, to give a reaction product. The reaction product may be heat-treated in vacuum or in an inert atmosphere. Alternatively, a mixture of the raw material powders may be heat-treated in vacuum or in an inert atmosphere to give a reaction product. The heat treatment may be performed at a temperature of greater than or equal to 100° C. and less than or equal to 300° C. for at least 1 hour. To reduce the compositional changes caused by the heat treatment, the raw material powders may be heat-treated in a hermetically sealed container, such as a quartz tube.

Positive Electrode Active Material 110

The positive electrode active material 110 contains lithium nickel cobalt manganese oxide.

One subject of study for a battery that includes lithium nickel cobalt manganese oxide as the positive electrode active material is an improvement in the average discharge voltage of the battery. High average discharge voltage may lead to decomposition of the electrolyte. To address this issue, in the present embodiment, the solid electrolyte material 111 having high oxidation resistance is used in combination with lithium nickel cobalt manganese oxide in the present embodiment. Thus, lithium nickel cobalt manganese oxide having a composition that can exhibit a high average discharge voltage can be actively employed as the positive electrode active material.

In the lithium nickel cobalt manganese oxide, for example, the ratio m2/m1 is less than or equal to 0.85 where m1 represents the total amount of substances of Ni, Co, and Mn and m2 represents the amount of substance of Ni. The ratio m2/m1 may also be referred to as the "Ni ratio". As indicated in Examples below, the average discharge voltage of the battery including lithium nickel cobalt manganese oxide increases as the Ni ratio decreases. A battery can have a high average discharge voltage when the Ni ratio is adjusted to less than or equal to 0.83. The ratio m2/m1 may be less than or equal to 0.83 or less than or equal to 0.60. The lower limit of the ratio m2/m1 is, for example, 0.30.

In the lithium nickel cobalt manganese oxide, for example, the ratio m3/m1 satisfies $0.18<m3/m1<0.37$ where m1 represents the total amount of substances of Ni, Co, and Mn and m3 represents the amount of substance of Mn. A battery can have a high average discharge voltage when the ratio m3/m1 is adjusted to satisfy $0.18<m3/m1<0.37$. The ratio m3/m1 may satisfy $0.20<m3/m1<0.34$.

The ratios m2/m1 and m3/m1 can be adjusted to desired values by changing the ratios of raw materials to be synthesized into lithium nickel cobalt manganese oxide.

The lithium nickel cobalt manganese oxide may be a material represented by $LiMeO_2$. Me contains Ni, Co, and Mn. In other words, lithium nickel cobalt manganese oxide may have a stoichiometric composition. This can provide lithium nickel cobalt manganese oxide that is chemically stable and has excellent cycle characteristics. However, lithium nickel cobalt manganese oxide having excess Li can also be employed as the positive electrode active material 110.

The positive electrode active material 110 has an $\alpha$-$NaFeO_2$ structure. The $\alpha$-$NaFeO_2$ structure is also called a layered rock-salt type structure. The layered rock-salt type structure is a crystal structure in which transition metal layers and lithium layers are alternately arranged with oxide ions therebetween. The layered rock-salt type structure is characterized by smooth lithium-ion desorption and insertion reactions in battery charge and discharge. Thus, the positive electrode active material 110 including the lithium nickel cobalt manganese oxide having an $\alpha$-$NaFeO_2$ structure is suitable for the positive electrode material 1000 of a battery.

The positive electrode active material 110 may consist essentially of lithium nickel cobalt manganese oxide.

The shape of the positive electrode active material 110 is not limited. The positive electrode active material 110 may have a particulate shape. Examples of the particulate shape include an acicular shape, a spherical shape, and an ellipsoidal shape. The positive electrode active material 110 may be in a pellet or plate form.

The surface of the positive electrode active material 110 may be at least partially coated with a coating material having a different composition from the solid electrolyte material 111.

The coating material may be a solid electrolyte material (second solid electrolyte material) containing, for example, an oxide solid electrolyte, a halide solid electrolyte, or a sulfide solid electrolyte.

Examples of the oxide solid electrolyte include Li—Nb—O compounds such as $LiNbO_3$, Li—B—O compounds such as $LiBO_2$ and $Li_3BO_3$, Li—Al—O compounds such as $LiAlO_2$, Li—Si—O compounds such as $Li_4SiO_4$, Li—S—O compounds such as $Li_2SO_4$, Li—Ti—O compounds such as $Li_4Ti_5O_{12}$, Li—Zr—O compounds such as $Li_2ZrO_3$, Li—Mo—O compounds such as $Li_2MoO_3$, Li—V—O compounds such as $LiV_2O_5$, Li—W—O compounds such as $Li_2WO_4$, and Li—P—O compounds such as $Li_3PO_4$.

Examples of the halide solid electrolyte include $Li_3YX_6$, $Li_2MgX_4$, $Li_2FeX_4$, $Li(Al, Ga, In)X_4$, and $Li_3(Al,Ga,In)X_6$. Here, X contains Cl. In this disclosure, when an element in a formula is expressed, for example, as "(Al,Ga,In)", the element is at least one selected from the group consisting of the elements in parentheses. In other words, "(Al,Ga,In)" is synonymous with "at least one selected from the group consisting of Al, Ga, and In".

Examples of the sulfide solid electrolyte include $Li_2S—P_2S_5$, $Li_2S—SiS_2$, $Li_2S—B_2S_3$, $Li_2S—GeS_2$, $Li_{3.25}Ge_{0.25}P_{0.75}S_4$, and $Li_{10}GeP_2S_{12}$. LiX, $Li_2O$, $MO_q$, $Li_pMO_q$, or the like may be added to them. Herein, the element X in "LiX" represents at least one element selected from the group consisting of F, Cl, Br, and I. The element M represents at least one element selected from the group consisting of P, Si, Ge, B, Al, Ga, In, Fe, and Zn. Each of p and q represents a natural number.

The above configuration can further improve the oxidation resistance of the positive electrode material 1000. This can reduce an increase in internal resistance of the battery on charge.

The positive electrode active material 110 and the solid electrolyte material 111 may be separated by a coating material and not be in direct contact with each other.

The above configuration can further improve the oxidation resistance of the positive electrode material 1000. This can reduce an increase in internal resistance of the battery on charge.

Since the solid electrolyte material 111 has high oxidation resistance, the positive electrode active material 110 does not have to be coated by a coating material. In other words, the positive electrode active material 110 may be in contact with the solid electrolyte material 111. The positive electrode material 1000 does not have to contain any solid electrolyte other than the solid electrolyte material 111.

The median diameter of the positive electrode active material 110 may be greater than or equal to 0.1 μm and less than or equal to 100 μm.

When the median diameter of the positive electrode active material 110 is greater than or equal to 0.1 μm, the positive electrode active material 110 and the solid electrolyte material 111 can be favorably dispersed in the positive electrode material 1000. This improves the charge and discharge properties of a battery including the positive electrode material 1000. When the median diameter of the positive electrode active material 110 is less than or equal to 100 μm, the lithium diffusion rate in the positive electrode active material 110 is improved. This enables the battery including the positive electrode material 1000 to operate with a high output.

The median diameter of the positive electrode active material 110 may be larger than the median diameter of the solid electrolyte material 111. With this configuration, the positive electrode active material 110 and the solid electrolyte material 111 can be favorably dispersed.

In the positive electrode material 1000, the mass ratio of the content of the positive electrode active material 110 to the content of the solid electrolyte material 111 is not particularly limited. The content of the positive electrode active material 110 may be the same as or different from the content of the solid electrolyte material 111.

Second Embodiment

Hereinafter, a second embodiment will be described. The same explanation as that in the first embodiment is omitted as appropriate.

Figure 2:
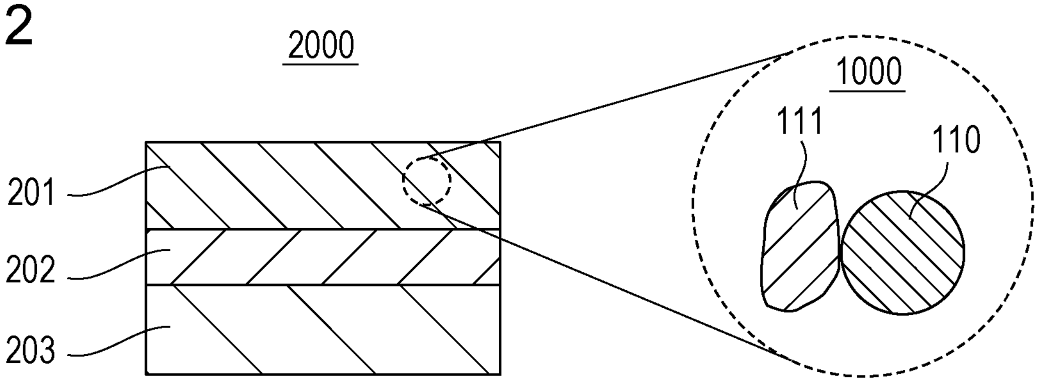
FIG. 2 is a cross-sectional view illustrating a schematic configuration of a battery according to a second embodiment.

FIG. 2 is a cross-sectional view illustrating a schematic configuration of a battery 2000 according to the second embodiment. The battery 2000 includes a positive electrode 201, an electrolyte layer 202, and a negative electrode 203. The positive electrode 201 contains the positive electrode material 1000 of the first embodiment. The electrolyte layer 202 is located between the positive electrode 201 and the negative electrode 203.

The above configuration can reduce an increase in internal resistance of the battery 2000 on charge. In other words, the above configuration can provide a battery 2000 that can be charged and discharged.

In the positive electrode 201, when the volume ratio of the positive electrode active material 110 to the solid electrolyte material 111 is represented by "v1:(100−v1)", $30 \leq v1 \leq 98$ may be satisfied. Here, v1 represents the volume ratio of the positive electrode active material 110, with the total volume of the positive electrode active material 110 and the solid electrolyte material 111 being taken as 100. When $30 \leq v1$ is satisfied, the battery 2000 can have sufficient energy density. When $v1 \leq 98$ is satisfied, the battery 2000 can operate with a high output.

The thickness of the positive electrode 201 may be greater than or equal to 10 μm and less than or equal to 500 μm. When the thickness of the positive electrode 201 is greater than or equal to 10 μm, the battery 2000 can have sufficient energy density. When the thickness of the positive electrode 201 is less than or equal to 500 μm, the battery 2000 can operate with a high output.

The electrolyte layer 202 contains an electrolyte material. The electrolyte material may be, for example, a third solid electrolyte material. In other words, the electrolyte layer 202 may be a solid electrolyte layer.

The third solid electrolyte material may be the same material as the first solid electrolyte material 111 or as the second solid electrolyte material, which is a coating material, in the first embodiment. In other words, the electrolyte layer 202 may contain the same material as the first solid electrolyte material 111 or the second solid electrolyte material.

The above configuration can further improve the output density and the charge and discharge properties of the battery 2000.

The same material as the first solid electrolyte material 111 may be used as the third solid electrolyte material. In other words, the electrolyte layer 202 may contain the same material as the first solid electrolyte material 111.

The above configuration can reduce an increase in the internal resistance of the battery 2000 caused by oxidation of the electrolyte layer 202 and can improve the output density and the charge and discharge properties of the battery 2000.

The third solid electrolyte material contained in the electrolyte layer 202 may be a halide solid electrolyte, a sulfide solid electrolyte, an oxide solid electrolyte, a polymeric solid electrolyte, or a complex hydride solid electrolyte.

Examples of the oxide solid electrolyte suitable for the third solid electrolyte material include NASICON-type solid electrolytes represented by $LiTi_2(PO_4)_3$ and element substitution products thereof, perovskite solid electrolytes represented by $(LaLi)TiO_3$, LISICON-type solid electrolytes represented by $Li_{14}ZnGe_4O_{16}$, $Li_4SiO_4$, $LiGeO_4$ and element substitution products thereof, garnet-type solid electrolytes represented by $Li_7La_3Zr_2O_{12}$ and element substitution products thereof, $Li_3PO_4$ and N-substitution products thereof, and glass or glass ceramic including a Li—B—O compound such as $LiBO_2$ and $Li_3BO_3$ as a base and a material such as $Li_2SO_4$ and $Li_2CO_3$ added to the base.

The polymeric solid electrolyte suitable for the third solid electrolyte material may be, for example, a compound of a polymeric compound and a lithium salt. The polymeric compound may have an ethylene oxide structure. The polymeric compound having the ethylene oxide structure can contain a large amount of lithium salt. This can further improve the ionic conductivity. Examples of the lithium salt may include $LiPF_6$, $LiBF_4$, $LiSbF_6$, $LiAsF_6$, $LiSO_3CF_3$, $LiN(SO_2F)_2$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt may be used alone, or two or more lithium salts may be used in combination.

Examples of the complex hydride solid electrolyte suitable for the third solid electrolyte material include $LiBH_4$—LiI and $LiBH_4$—$P_2S_5$.

The electrolyte layer 202 may contain the third solid electrolyte material as a main component. In other words, the electrolyte layer 202 may contain the third solid electrolyte material, for example, in a ratio of greater than or equal to 50% by mass to the whole electrolyte layer 202. The ratio may be 70% by mass.

The above configuration can improve the charge and discharge properties of the battery 2000.

The electrolyte layer 202 contains the third solid electrolyte material as a main component and may further contain inevitable impurities, such as starting raw materials used to synthesize the third solid electrolyte material, by-products, and degraded products.

The electrolyte layer 202 may contain the third solid electrolyte material in a ratio of 100% by mass to the whole electrolyte layer 202, excluding, for example, inevitable impurities.

The above configuration can further improve the charge and discharge properties of the battery 2000.

The electrolyte layer 202 may consist solely of the third solid electrolyte material.

The electrolyte layer 202 may contain two or more of the materials listed as the examples of the materials of the third solid electrolyte material. For example, the electrolyte layer 202 may contain a halide solid electrolyte and a sulfide solid electrolyte.

The thickness of the electrolyte layer 202 may be greater than or equal to 1 μm and less than or equal to 300 μm. When the thickness of the electrolyte layer 202 is greater than or equal to 1 μm, a short circuit is less likely to occur between the positive electrode 201 and the negative electrode 203. When the thickness of the electrolyte layer 202 is less than or equal to 300 μm, the battery 2000 can operate with a high output.

The negative electrode 203 contains a material capable of occluding and releasing metal ions, such as lithium-ions. The negative electrode 203 contains, for example, a negative electrode active material.

Examples of the negative electrode active material include metal materials, carbon materials, oxides, nitrides, tin compounds, and silicon compounds. The metal material may be an elemental metal or an alloy. Examples of the metal material include lithium metal and a lithium alloy. Examples of the carbon material include natural graphite, coke, graphitizing carbon, carbon fibers, spherical carbon, artificial graphite, and amorphous carbon. In view of capacity density, preferable examples of the negative active material include silicon (or Si), tin (or Sn), a silicon compound, and a tin compound. One or more materials selected from these materials may be used as the negative electrode active material.

The negative electrode 203 may contain a solid electrolyte material. The solid electrolyte material may be a solid electrolyte material listed as the examples of the material of the electrolyte layer 202. The above configuration can improve the lithium-ion conductivity in the negative electrode 203, enabling the battery 2000 to operate with a high output.

The median diameter of the particles of negative electrode active material may be greater than or equal to 0.1 μm and less than or equal to 100 μm. When the median diameter of the particles of the negative electrode active material is greater than or equal to 0.1 μm, the negative electrode active material particles and the solid electrolyte material can be favorably dispersed in the negative electrode. This improves the charge and discharge properties of the battery 2000. When the median diameter of the particles of the negative electrode active material is less than or equal to 100 μm, the lithium diffusion rate in the negative electrode active material is improved. This enables the battery 2000 to operate with a high output.

The median diameter of the particles of the negative electrode active material may be larger than the median diameter of the solid electrolyte material included in the negative electrode 203. With this configuration, the particles of the negative electrode active material and the solid electrolyte material can be favorably dispersed.

When the volume ratio of the negative electrode active material to the solid electrolyte material in the negative electrode 203 is represented by "v2:(100−v2)", $30 \leq v2 \leq 95$ may be satisfied. Here, v2 represents the volume ratio of the negative electrode active material, with the total volume of the negative electrode active material and the solid electrolyte material being taken as 100. When $30 \leq v2$ is satisfied, the battery 2000 can have a sufficient energy density. When $v2 \leq 95$ is satisfied, the battery 2000 can operate with a high output.

The thickness of the negative electrode 203 may be greater than or equal to 10 μm and less than or equal to 500 μm. When the thickness of the negative electrode 203 is greater than or equal to 10 μm, the battery 2000 can have a sufficient energy density. When the thickness of the negative electrode 203 is less than or equal to 500 μm, the battery 2000 can operate with a high output.

At least one selected from the group consisting of the positive electrode 201, the electrolyte layer 202, and the negative electrode 203 may contain a binder to improve adhesion between the particles. The binder is used to improve the binding strength of the materials that constitute the electrode. Examples of the binder include polyvinylidene fluoride, polytetrafluoroethylene, polyethylene, polypropylene, an aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymetachrylic acid ethyl ester, polymethacrylic acid hexyl ester, polyvinyl acetate, polyvinylpyrrolidone, polyether, polyethersulfone, hexafluoropolypropylene, styrene butadiene rubber, and carboxymethyl cellulose. A copolymer may be used as a binder. The binder may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadien. A mixture of two or more selected from the above materials may also be used as a binder.

At least one of the positive electrode 201 or the negative electrode 203 may contain a conductive additive to improve the electronic conductivity. Examples of the conductive additive include (i) graphites such as natural graphite and artificial graphite, (ii) carbon blacks such as acetylene black and Ketjen black, (iii) conductive fibers such as carbon fibers and metal fibers, (iv) fluorocarbon, (v) metal powders such as an aluminum powder, (vi) conductive whiskers such as zinc oxide whiskers and potassium titanate whiskers, (vii) conductive metal oxides such as titanium oxide, and (viii) conductive polymer compounds such as polyaniline, polypyrrole, and polythiophene. The above (i) or (ii) may be used as a conductive additive to reduce the cost.

Examples of the shape of the battery 2000 include a coin-like shape, a cylindrical shape, a rectangular shape, a sheet-like shape, a button-like shape, a flat shape, and a multilayer shape.

In an example, the positive electrode material 1000, a material for forming an electrolyte layer, and a material for forming a negative electrode are provided, and then a stack including a positive electrode, an electrolyte layer, and a negative electrode, in this order, is formed using a known method to produce the battery 2000.

Third Embodiment

Hereinafter, a third embodiment will be described. The same explanation as that in the second embodiment is omitted as appropriate.

Figure 3:
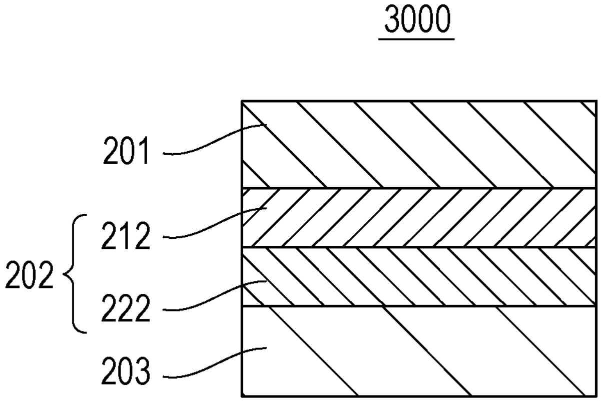
FIG. 3 is a cross-sectional view illustrating a schematic configuration of a battery according to a third embodiment.

FIG. 3 is a cross-sectional view illustrating a schematic configuration of a battery 3000 according to the third embodiment. The battery 3000 includes a positive electrode 201, an electrolyte layer 202, and a negative electrode 203. The battery 3000 has the same configuration as the battery 2000 of the second embodiment, except that the electrolyte layer 202 is composed of multiple layers.

The electrolyte layer 202 includes a first electrolyte layer 212 and a second electrolyte layer 222. The first electrolyte layer 212 is located between the positive electrode 201 and the second electrolyte layer 222. The second electrolyte layer 222 is located between the first electrolyte layer 212 and the negative electrode 203. The first electrolyte layer 212 is in contact with the positive electrode 201. The second electrolyte layer 222 is in contact with the negative electrode 203.

The above configuration can reduce an increase in the internal resistance of the battery 3000 on charge.

The first electrolyte layer 212 may contain the first solid electrolyte material 111.

When the first solid electrolyte material 111 having high oxidation resistance is included in the first electrolyte layer 212, oxidative degradation of the first electrolyte layer 212 is reduced, which can reduce the increase in internal resistance of the battery 3000 on charge.

The second electrolyte layer 222 may contain an electrolyte material having a composition different from that of the first solid electrolyte material 111.

In view of the reduction resistance of the solid electrolyte material, the reduction potential of the solid electrolyte material contained in the first electrolyte layer 212 may be lower than that of the solid electrolyte material contained in the second electrolyte layer 222. The above configuration enables the solid electrolyte material in the first electrolyte layer 212 to be used without reduction. This can improve the charge and discharge efficiency of the battery 3000.

For example, the second electrolyte layer 222 may contain a sulfide solid electrolyte. Here, the reduction potential of the sulfide solid electrolyte in the second electrolyte layer 222 is lower than that of the solid electrolyte material contained in the first electrolyte layer 212. The above configuration enables the solid electrolyte material in the first electrolyte layer 212 to be used without reduction. This can improve the charge and discharge efficiency of the battery 3000.

The thickness of each of the first electrolyte layer 212 and the second electrolyte layer 222 may be, for example, greater than or equal to 1 μm and less than or equal to 300 μm. When each of the thickness of the first electrolyte layer 212 and the thickness of the second electrolyte layer 222 is greater than or equal to 1 μm, a short circuit is less likely to occur between the positive electrode 201 and the negative electrode 203. When the first electrolyte layer 212 and the second electrolyte layer 222 each have a thickness of less than or equal to 300 μm, the battery 3000 can operate with a high output.

EXAMPLES

Hereafter, the present disclosure will be described in further detail with reference to Examples.

Example 1

Production of Solid Electrolyte Material

In an argon glove box having a dew point of lower than or equal to −60° C., LiF, $TiF_4$, and $AlF_3$ as raw material powders were weighed to be in a molar ratio of LiF:$TiF_4$:$AlF_3$=2.6:0.4:0.6. These were pulverized and mixed in a mortar to produce a mixture. Then, the mixture was subjected to a milling treatment at 500 rpm for 12 hours by using a planetary ball mill (Model P-7 manufactured by Fritsch). In this way, a powder of $Li_{2.6}Ti_{0.4}Al_{0.6}F_6$ was produced as the solid electrolyte material of Example 1.

Production of Positive Electrode Material $LiNiCoMnO_2$ (molar ratio Ni:Co:Mn=83:12:5) as the positive electrode active material and $Li_{2.6}Ti_{0.4}Al_{0.6}F_6$ as the solid electrolyte material were weighed to be in a mass ratio of 60:40 and mixed in a mortar. In this way, the positive electrode material of Example 1 was produced. In other words, in Example 1, m2/m1 was 0.83, and m3/m1 was 0.05.

Production of Battery

In an insulating outer cylinder, 15 mg of the positive electrode material and 80 mg of $Li_{2.6}Ti_{0.4}Al_{0.6}F_6$ as the solid electrolyte material were put. Then, the positive electrode material and the solid electrolyte material were press-molded at a pressure of 720 MPa. A stack including the positive electrode and the solid electrolyte layer was produced in this way.

Next, a metal In, a metal Li, a metal In, a metal In, a metal Li, and a metal In are layered in this order on the stack to produce the negative electrode. The thickness of the metal In was 200 μm. The thickness of the metal Li was 200 μm. The positive electrode, the solid electrolyte layer, and the negative electrode were press-molded at a pressure of 80 MPa. In this way, a battery element including the positive electrode, the solid electrolyte layer, and the negative electrode was produced.

Next, a stainless-steel current collector was placed on and under the battery element. The current collection leads were attached to the current collectors.

Finally, the insulating outer cylinder was sealed with an insulating ferrule so that the inside of the outer cylinder was shielded from the outside atmosphere. In this way, the battery of Example 1 was produced.

Example 2

$LiNiCoMnO_2$ (molar ratio Ni:Co:Mn=6:2:2) as the positive electrode active material and $Li_{2.6}Ti_{0.4}Al_{0.6}F_6$ as the solid electrolyte material were weighed to be in a mass ratio of 60:40 and mixed in a mortar. In this way, the positive electrode material of Example 2 was produced. In other words, in Example 2, m2/m1 was 0.60, and m3/m1 was 0.20.

A battery of Example 2 was produced by the same method as in Example 1 by using the positive electrode material of Example 2.

Example 3

$LiNiCoMnO_2$ (molar ratio Ni:Co:Mn=1:1:1) as the positive electrode active material and $Li_{2.6}Ti_{0.4}Al_{0.6}F_6$ as the solid electrolyte material were weighed to be in a mass ratio of 60:40 and mixed in a mortar. In this way, the positive electrode material of Example 3 was produced. In other words, in Example 3, m2/m1 was 1/3, and m3/m1 was 1/3.

A battery of Example 3 was produced by the same method as in Example 1 by using the positive electrode material of Example 3.

[Charge and Discharge Test]

The batteries of Examples 1 to 3 were each subjected to a charge and discharge test under the following conditions.

The battery was placed in a 85° C. thermostatic chamber.

The battery was charged at a constant current of 0.05 C rate (20-hour rate) relative to the theoretical capacity of the battery. The end-of-charge voltage was 4.38 V (5.0 V vs. $Li/Li^+$), and the end-of-discharge voltage was 1.88.

The batteries in Examples 1 to 3 were all able to be charged and discharged. In other words, oxidative degradation of the solid electrolyte material of the positive electrode was reduced.

Figure 4:
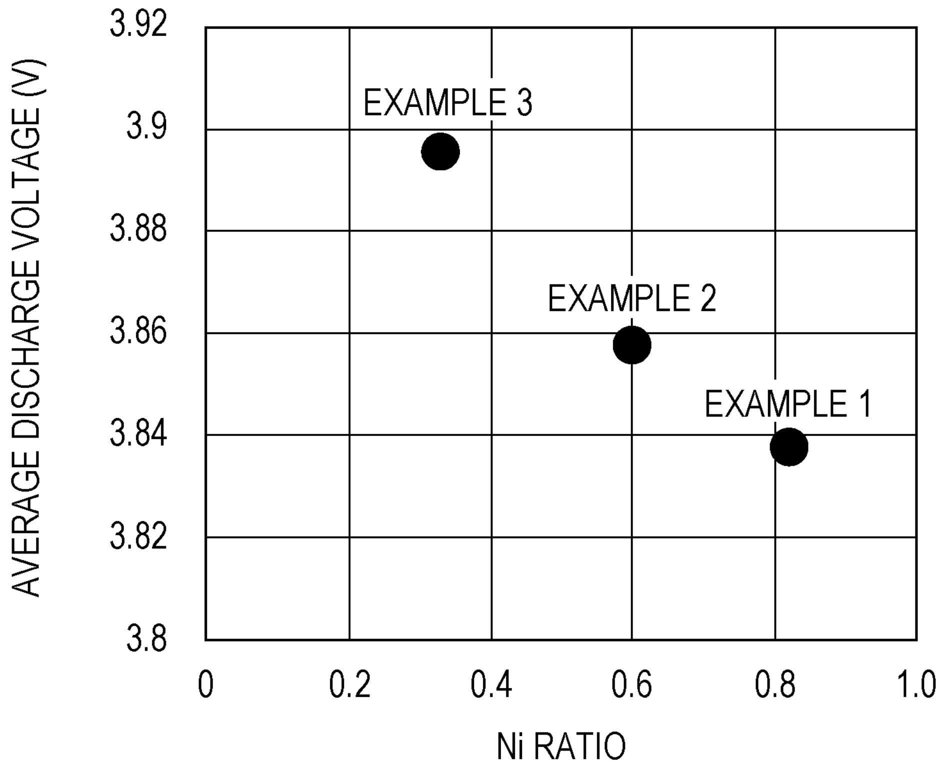
FIG. 4 is a graph indicating relationship between the Ni ratio and the average discharge voltage of the batteries of Examples 1 to 3.

FIG. 4 is a graph indicating relationship between the Ni ratio and the average discharge voltage of batteries of Examples 1 to 3. The Ni ratio (%) on the horizontal axis indicates the ratio m2/m1 where m1 represents the total amount of substances of Ni, Co, and Mn and m2 represents the amount of substance of Ni in the lithium nickel cobalt manganese oxide as the positive electrode active material.

As indicated in FIG. 4, the average discharge voltage increased as the Ni ratio of the positive electrode active material decreased. This may be resulted from that $Li_{2.6}Ti_{0.4}Al_{0.6}F_6$, which is the solid electrolyte material, has high oxidation resistance. This reduced the decomposition of the solid electrolyte material and allowed the positive electrode active material (NCM) to have the original reaction.

The battery in Example 2 exhibited a higher average discharge voltage than the battery in Example 1. The battery in Example 3 exhibited a higher average discharge voltage than the batteries in Examples 1 and 2.

The present disclosure can be used, for example, for all-solid-state lithium-ion secondary batteries.

What is claimed is:

1. A positive electrode material comprising:

a positive electrode active material containing lithium nickel cobalt manganese oxide having an $\alpha$-$NaFeO_2$ structure; and a solid electrolyte material, wherein the solid electrolyte material contains Li, Ti, M1, and F, and M1 is at least one selected from the group consisting of Ca, Mg, Al, Y, and Zr, and wherein the solid electrolyte material contains $Li_{2.6}Ti_{0.4}Al_{0.6}F_6$.

2. The positive electrode material according to claim 1, wherein, in the lithium nickel cobalt manganese oxide, a ratio m2/m1 is less than or equal to 0.85 where m1 represents a total amount of substances of Ni, Co, and Mn and m2 represents an amount of substance of Ni.

3. The positive electrode material according to claim 2, wherein the ratio m2/m1 is less than or equal to 0.83.

4. The positive electrode material according to claim 1, wherein, in the lithium nickel cobalt manganese oxide, a ratio m3/m1 satisfies 0.18<m3/m1<0.37 where m1 represents a total amount of substances of Ni, Co, and Mn and m3 represents an amount of substance of Mn.

5. The positive electrode material according to claim 4, wherein the ratio m3/m1 satisfies 0.20<m3/m1<0.34.

6. The positive electrode material according to claim 1, wherein the lithium nickel cobalt manganese oxide is represented by $LiMeO_2$, and Me contains Ni, Co, and Mn.

7. The positive electrode material according to claim 1, wherein M1 contains at least one selected from the group consisting of Al and Y.

8. The positive electrode material according to claim 1, wherein M1 is Al.

9. The positive electrode material according to claim 1, wherein the solid electrolyte material has a crystalline phase represented by the following Formula (2):

$$Li_{6-(4-x2)b2}(Ti_{1-x2}M1_{x2})_{b2}F_6 \quad (2)$$

where $0<x2<1$ and $0<b2\leq1.5$ are satisfied.

10. A battery comprising:

a positive electrode;

a negative electrode; and an electrolyte layer disposed between the positive electrode and the negative electrode, wherein the positive electrode contains the positive electrode material according to claim 1.

* * * * *